(12) United States Patent
Suh et al.

(10) Patent No.: US 12,447,996 B2
(45) Date of Patent: Oct. 21, 2025

(54) METHOD AND APPARATUS FOR CONTROLLING VEHICLE USING VOICE OR FACIAL EXPRESSIONS

(71) Applicants: Hyundai Motor Company, Seoul (KR); Kia Corporation, Seoul (KR)

(72) Inventors: Jung Seok Suh, Yongin-si (KR); Yu Na Lee, Suwon-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 123 days.

(21) Appl. No.: 18/316,636

(22) Filed: May 12, 2023

(65) Prior Publication Data
US 2024/0166234 A1  May 23, 2024

(30) Foreign Application Priority Data
Nov. 22, 2022  (KR) .......... 10-2022-0157360

(51) Int. Cl.
*B60W 60/00* (2020.01)
*B60W 40/08* (2012.01)
*B60W 50/14* (2020.01)
*G06V 20/59* (2022.01)
*G06V 40/16* (2022.01)

(52) U.S. Cl.
CPC .......... *B60W 60/001* (2020.02); *B60W 40/08* (2013.01); *B60W 50/14* (2013.01); *G06V 20/59* (2022.01); *G06V 40/174* (2022.01); *B60W 2040/089* (2013.01); *B60W 2050/143* (2013.01); *B60W 2050/146* (2013.01);
(Continued)

(58) Field of Classification Search
CPC .... B60W 60/001; B60W 40/08; B60W 50/14; B60W 2040/089; B60W 2050/143; B60W 2050/146; B60W 2540/043; B60W 2540/21; B60W 2540/215; B60W 50/08; B60W 30/18009; B60W 50/10; B60W 60/005; B60W 2540/01; B60W 30/18163; B60W 40/10; B60W 60/0013; B60W 60/0051; B60W 2050/0005; B60W 2420/403; G06V 20/59; G06V 40/174; G06V 40/172; G06V 40/12; G06V 40/168
See application file for complete search history.

(56) References Cited

U.S. PATENT DOCUMENTS

2018/0208207 A1* 7/2018 Osotio .................. B60W 40/08
2019/0378515 A1* 12/2019 Kim ....................... G10L 17/22
(Continued)

FOREIGN PATENT DOCUMENTS

EP  3944232 A1 * 1/2022 .......... B60W 60/001

*Primary Examiner* — Anne Marie Antonucci
*Assistant Examiner* — Patrick Daniel Mohl
(74) *Attorney, Agent, or Firm* — Slater Matsil, LLP

(57) ABSTRACT

In an embodiment a method for controlling a vehicle using a vehicle control apparatus is disclosed. The method includes determining whether one or more occupants are in the vehicle and determining whether to change a route based on a conversation between a main occupant and a non-main occupant, a voice of the main occupant, or a facial expression of the main occupant. The method further includes providing a determination result to the main occupant or the non-main occupant, wherein the determination result is displayed or announced by voice, and driving the vehicle based on the determination result.

18 Claims, 9 Drawing Sheets

(52) U.S. Cl.
CPC ... *B60W 2540/043* (2020.02); *B60W 2540/21* (2020.02); *B60W 2540/215* (2020.02)

(56) References Cited

U.S. PATENT DOCUMENTS

| | | | | |
|---|---|---|---|---|
| 2020/0062265 | A1* | 2/2020 | Wunderlich | B60W 40/08 |
| 2020/0198620 | A1* | 6/2020 | Nakata | B60W 60/0053 |
| 2020/0216086 | A1* | 7/2020 | Lenke | B60W 30/18 |
| 2021/0061224 | A1* | 3/2021 | Kim | B60R 25/01 |
| 2021/0149397 | A1* | 5/2021 | Shin | G06V 20/56 |
| 2021/0347328 | A1* | 11/2021 | Bhattacharya | G05B 13/027 |
| 2022/0214701 | A1* | 7/2022 | Park | G06V 20/59 |
| 2023/0081186 | A1* | 3/2023 | Gerrese | G06Q 50/40 701/26 |

* cited by examiner

YOU CANNOT 'STOP' WITHOUT CONSENT OF MAIN OCCUPANT.
PLEASE DISCUSS WITH MAIN OCCUPANT.

THERE IS REQUEST FOR 'ADDING WAYPOINT' FROM OCCUPANT
IN SECOND ROW. DO YOU WANT TO STOP?
ADDING WAYPOINT ADDS [3 MINUTES].

CHANGE (5s)   NO CHANGE (5s)

METHOD AND APPARATUS FOR CONTROLLING VEHICLE USING VOICE OR FACIAL EXPRESSIONS

CROSS-REFERENCE TO RELATED APPLICATIONS

This application claims the benefit of Korean Patent Application No. 10-2022-0157360, filed on Nov. 22, 2022, which application is hereby incorporated herein by reference.

TECHNICAL FIELD

The present disclosure relates to a vehicle control method and apparatus using voice or facial expressions.

BACKGROUND

The contents described below merely provide background information related to the present embodiments and do not constitute related art.

Autonomous vehicles refer to vehicles that may drive to a desired destination by operating a steering wheel, accelerator pedal, brake, etc. according to a program algorithm, without the driver's direct operation.

As voice recognition technology and face recognition technology have developed, voice recognition technology and face recognition technology have been applied to vehicles to improve user convenience and driving concentration. Autonomous vehicles may drive by recognizing the driver's voice or face.

When there are many occupants in a vehicle, a voice recognition system and a face recognition system output a voice recognition result or a face recognition result based on an occupant who speaks, or perform a function corresponding to the voice recognition result and the face recognition result. However, since a non-main occupant may also express his/her intentions in addition to a main occupant, it is necessary to consider voices and facial expressions of the non-main occupant.

SUMMARY

The present disclosure relates to a vehicle control method and apparatus using voice or facial expressions. Particular embodiments relate to a method and apparatus for controlling a vehicle using voice or facial expressions of a main occupant and a non-main occupant.

According to embodiments of the present disclosure, a vehicle control method includes determining a main occupant in a situation in which one or more occupants are in a vehicle, determining whether to change a route based on a conversation between the main occupant and a non-main occupant, a voice of the main occupant, or a facial expression of the main occupant, providing a determination result to the main occupant or the non-main occupant, wherein the determination result is displayed or announced by voice, and driving the vehicle based on the determination result.

According to embodiments of the present disclosure, a vehicle control apparatus, including a memory and a processor configured to determine a main occupant in a situation in which an occupant is in a vehicle, determine whether to change a route based on a conversation between the main occupant and a non-main occupant, a voice of the main occupant, or a facial expression of the main occupant, provide a determination result to the main occupant or the non-main occupant, and drive the vehicle based on the determination result, wherein the determination result is displayed or announced by voice.

DETAILED DESCRIPTION OF ILLUSTRATIVE EMBODIMENTS

Figure 1:
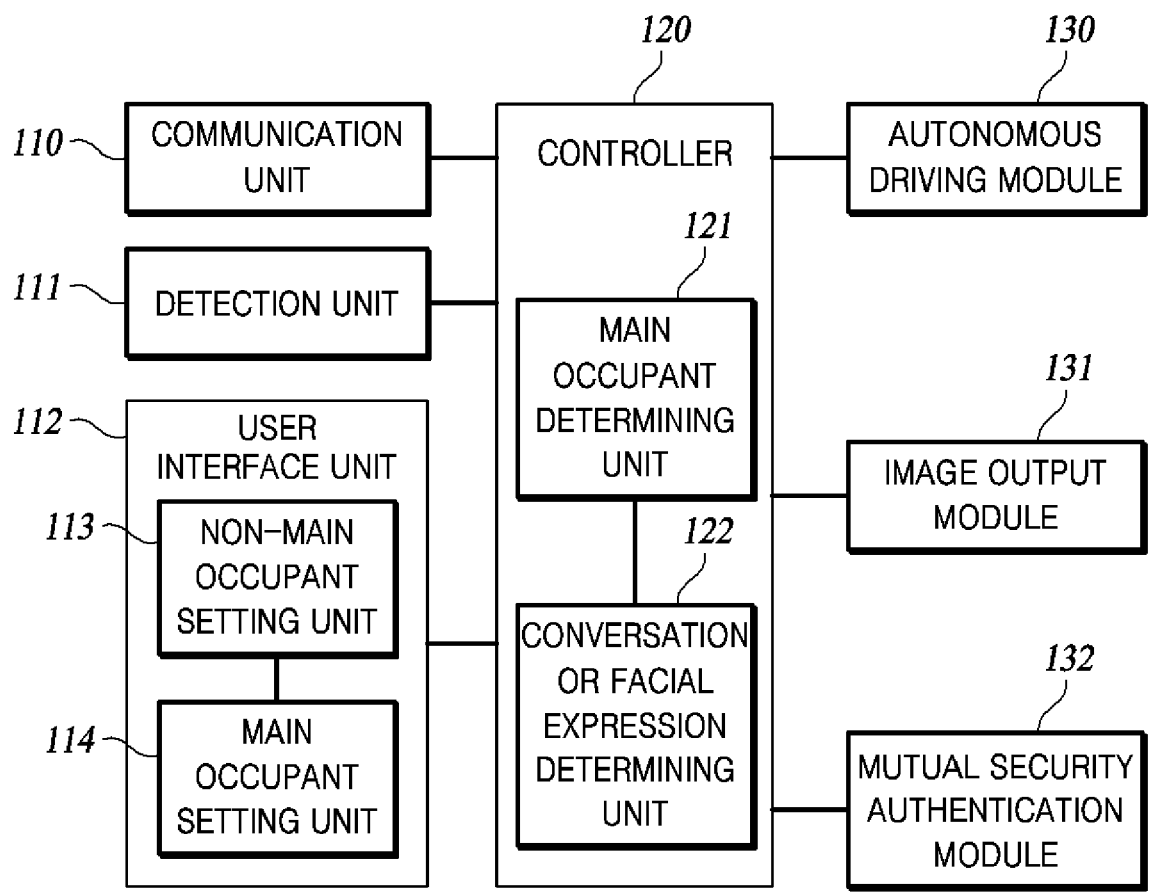
FIG. 1 is a diagram illustrating a vehicle control apparatus mounted in a vehicle that a main occupant and a non-main occupant board, according to an embodiment of the present disclosure.

In view of the above, embodiments of the present disclosure provide a method and apparatus for controlling a vehicle that take into consideration not only voice or facial expressions of a main occupant but also voice or facial expressions of a non-main occupant.

In addition, embodiments of the present disclosure provide a method and apparatus for effectively managing an autonomous driving command system between a main occupant and a non-main occupant.

In addition, embodiments of the present disclosure provide a method and apparatus for effectively distinguishing between autonomous driving commands of a main occupant and a non-main occupant.

The problems solvable by embodiments of the present disclosure are not limited to the problems mentioned above, and other problems not mentioned will be clearly understood by those skilled in the art from the description below.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary.

The following detailed description, together with the accompanying drawings, is intended to describe exemplary embodiments of the present invention, and is not intended to represent the only embodiments in which the present invention may be practiced.

FIG. 1 is a diagram illustrating a vehicle control apparatus mounted in a vehicle that a main occupant and a non-main occupant board, according to an embodiment of the present disclosure.

Referring to FIG. 1, each autonomous vehicle may include a communication unit 11o, a detection unit 111, a user interface unit 112, a controller 120, an autonomous driving module 130, an image output module 131, and a mutual security authentication module 132. The user interface unit 112 may include a non-main occupant setting unit 113 and a main occupant setting unit 114. The controller 120 may include a main occupant determining unit 121 and a conversation or facial expression determining unit 122.

The communication unit 11o may transmit and receive information through a communication network between autonomous vehicles. The communication unit 11o may transmit and receive information between autonomous vehicles through at least one communication method among wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), and LTE-advanced (LTE-A).

Also, the communication unit 11o may perform short-distance communication between autonomous vehicles. Since autonomous vehicles drive while maintaining a short distance from each other, the communication unit 11o may transmit/receive information between autonomous vehicles through short-range wireless communication. In this case, the communication unit 110 may allow various types of information to be transmitted and received between autonomous vehicles through Bluetooth, radio-frequency identification (RFID), infrared data association (IrDA), ultra wideband (UWB), ZigBee, near field communication (NFC), Wi-Fi, Wi-Fi Direct, wireless USB, and the like.

The detection unit 111 may include a radar, a camera, and LIDAR. The detection unit 111 may detect a speed and position of an autonomous vehicle nearby. The detection unit 111 may detect all objects, including obstacles, people, animals, toll booths, and breakwaters, in addition to autonomous vehicles. The user interface unit 112 may provide a user interface to a driver. The user interface unit 112 may receive information from the driver and input the information to the controller 120 or output a result according to an operation. For example, the driver may input information on the autonomous vehicle nearby into the user interface unit 112. The user interface unit 112 may input the information on the autonomous vehicle nearby into the controller 120. The controller 120 may issue a control command to the autonomous driving module 130 by using the information on the autonomous vehicle nearby. The user interface unit 112 may correspond to a graphical user interface (GUI), a human machine interface (HMI), or an auditory user interface (AUI).

The non-main occupant setting unit 113 may provide an interface to a non-main occupant. The non-main occupant may input a command for starting, changing a route, stopping, etc. related to autonomous driving to the non-main occupant setting unit 113. The non-main occupant corresponds to an occupant who is not a main occupant. The non-main occupant may correspond to an infant, an elderly person, or a patient. The main occupant setting unit 114 may provide an interface to the main occupant. The main occupant may input a command for starting, changing a route, stopping, etc. related to autonomous driving to the main occupant setting unit 114. The main occupant may approve or reject the autonomous driving command of the non-main occupant using the main occupant setting unit 114.

The controller 120 may control the autonomous driving module 130, the image output module 131, and the mutual security authentication module 132 according to information received from the communication unit 11o, the detection unit in, and the user interface unit 112. The autonomous driving module 130 may change or maintain the speed and direction of the vehicle according to a control command from the controller 120. The image output module 131 may output images of surrounding vehicles, surrounding obstacles, surrounding buildings, etc. to the driver according to a control command from the controller 120. The mutual security authentication module 132 may perform authentication using identifiers (IDs) of vehicles nearby according to a control command from the controller 120. The autonomous vehicle may defend against spoofing attacks by attackers through such authentication.

The main occupant determining unit 121 may determine where the main occupant is located in the vehicle by using a microphone, a camera, a fingerprint recognizing unit, a mobile device location recognizing unit, etc. installed in the vehicle. The conversation or facial expression determining unit 122 may analyze a conversation between the main occupant and the non-main occupant and facial expressions of the main occupant and the non-main occupant. The conversation or facial expression determining unit 122 may determine whether the main occupant responds affirmatively or negatively by using an analysis result and text mining.

Figure 2:
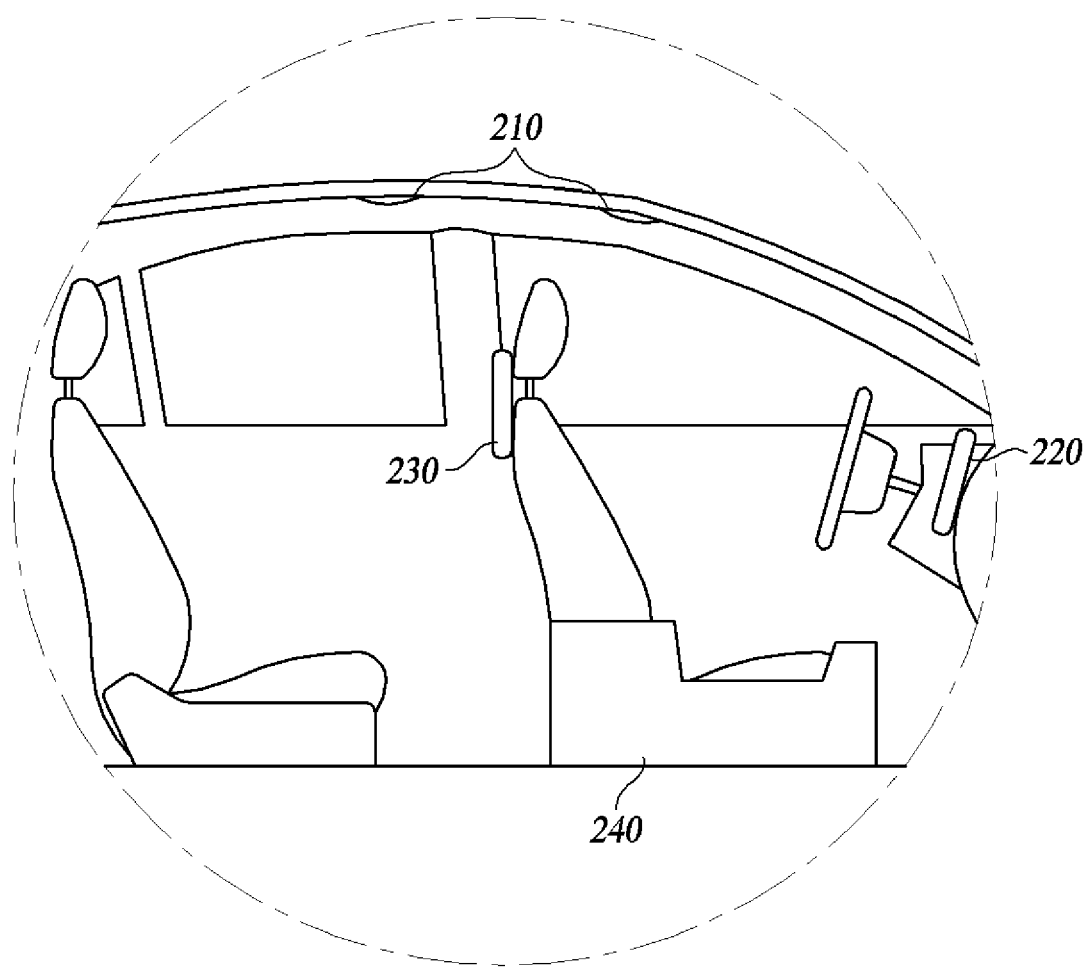
FIG. 2 is a diagram illustrating a device for recognizing a voice, face, fingerprint, or a mobile device of a main occupant in a vehicle according to an embodiment of the present disclosure.

FIG. 2 is a diagram illustrating a device for recognizing a voice, face, fingerprint, or mobile device of a main occupant in a vehicle according to an embodiment of the present disclosure. The main occupant may input information such as a voice, a face shape, or a fingerprint into a mobile device. The mobile device may interwork with the vehicle. The vehicle may receive the information such as a voice, a face shape, or a fingerprint of the main occupant from the mobile device of the main occupant.

Referring to FIG. 2, a microphone 210, a first row HMI 220, a second row HMI 230, and a mobile device recognizing unit 240 may be mounted in the vehicle. The microphone 210 may recognize a voice of a person present in the vehicle and obtain voice information. The first row HMI 220 and the second row HMI 230 may receive an autonomous driving command. The first row HMI 220 and the second row HMI 230 may recognize a face of a person in the vehicle or a fingerprint of a person in the vehicle. The mobile device recognizing unit 240 may recognize a location of a mobile device of a person present in the vehicle.

When one person is present in the vehicle, an autonomous driving command may be input to both the first row HMI 220 and the second row HMI 230. When a plurality of people are present in the vehicle and a main occupant is present in the first row, an autonomous driving command may be input to the first row HMI 220. When a plurality of people are present in the vehicle and the main occupant is in the first row, an autonomous driving command may be input to the second row HMI 230 when the main occupant agrees. Whether or not there is consent of the main occupant may be determined by analyzing a conversation or a facial expression. The autonomous driving command may be performed through voice or display input.

Figure 3:
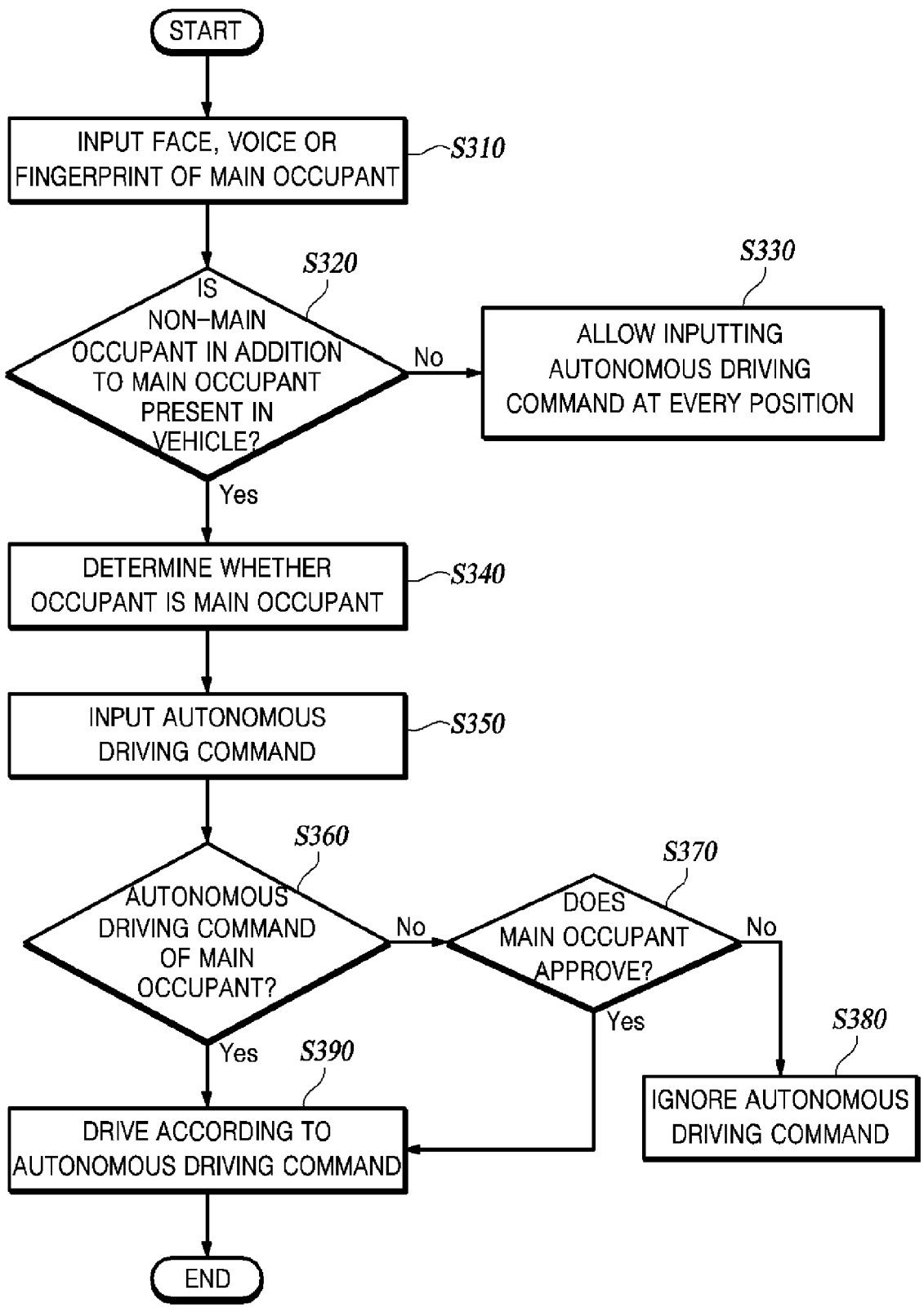
FIG. 3 is a diagram illustrating a process of controlling a vehicle according to autonomous driving commands of a main occupant and a non-main occupant according to an embodiment of the present disclosure.

FIG. 3 is a diagram illustrating a process of controlling a vehicle according to autonomous driving commands of a main occupant and a non-main occupant according to an embodiment of the present disclosure.

Referring to FIG. 3, the main occupant may call a robotaxi or an autonomous vehicle using a mobile device. The main occupant may input his or her voice, face shape, fingerprint, or the like into the mobile device (S310). The mobile device may interwork with the called vehicle. The vehicle may receive the voice, face shape, fingerprint, or the like of the main occupant from the mobile device. Whether a non-main occupant, besides the main occupant, is present in the vehicle may be determined (S320). When only the main occupant is present in the vehicle (S320—NO), an autonomous driving command may be input anywhere in the vehicle (S330). Autonomous driving commands may be input to the first row HMI and the second row HMI in the vehicle. When a non-main occupant other than the main occupant is also present in the vehicle (S320—YES), whether the occupant is the main occupant may be determined using the voice, facial shape, fingerprint, or the like of the main occupant (S340). The mobile device location recognizing unit may determine a location of the main occupant.

An autonomous driving command may be input (S350). Whether the input autonomous driving command is an autonomous driving command of the main occupant may be determined (S360). If the input autonomous driving command is not an autonomous driving command of the main occupant (S360—NO), it may be determined whether the main occupant approves the input autonomous driving command (S370). Such an autonomous driving command may correspond to an input by a non-main occupant. Whether the main occupant approves the autonomous driving command of the non-main occupant is determined by using a voice or facial expression of the main occupant. If the main occupant does not approve the input autonomous driving command (S370—NO), the autonomous driving command of the non-main occupant may be ignored (S380). If the main occupant approves the input autonomous driving command (S370—YES), the vehicle may drive according to the autonomous driving command of the non-main occupant (S390). If the input autonomous driving command is an autonomous driving command of the main occupant (S360—YES), the vehicle may drive according to the main occupant's autonomous driving command (S390).

Figure 4:
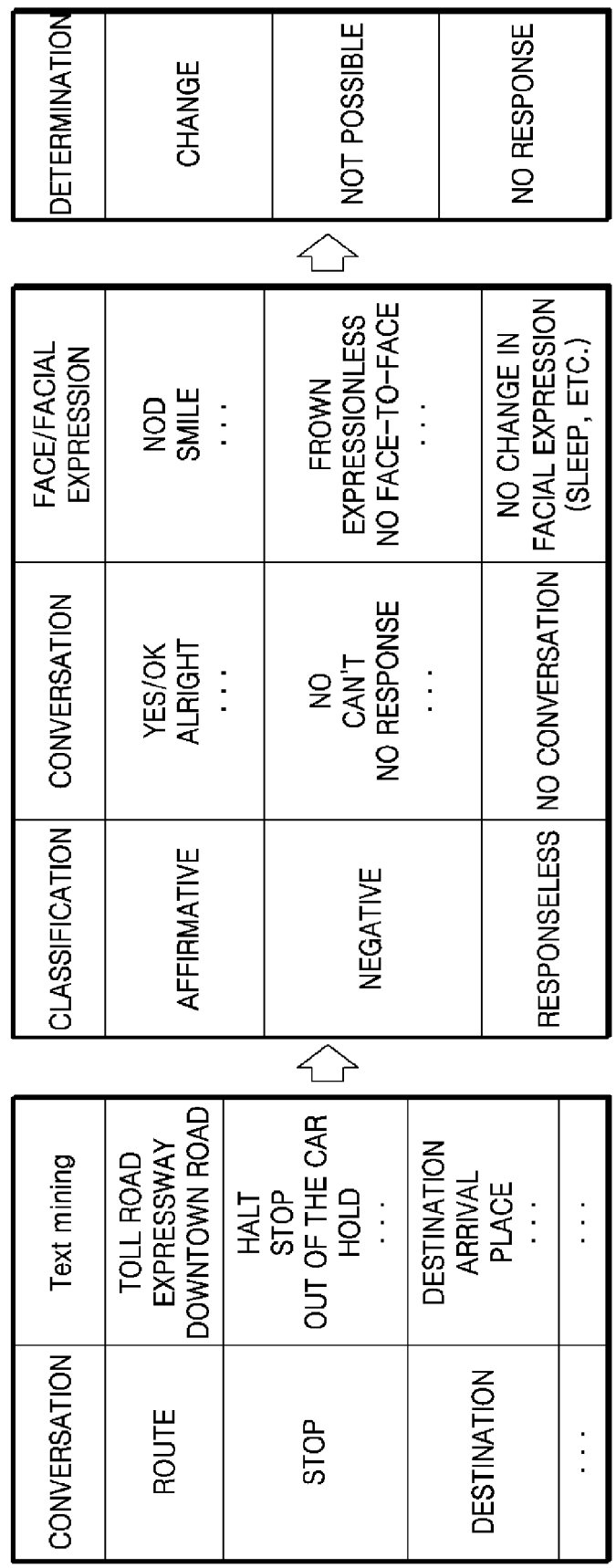
FIG. 4 is a diagram illustrating whether an autonomous driving-related route or destination, etc. is changed according to conversations and facial expressions between a main occupant and a non-main occupant, according to an embodiment of the present disclosure.

FIG. 4 is a diagram illustrating whether to change an autonomous driving-related route or destination according to conversations and facial expressions between a main occupant and a non-main occupant, according to an embodiment of the present disclosure. When the main occupant and the non-main occupant have a conversation related to autonomous driving, a process of determining a conversation related to autonomous driving may be performed. The process of determining a conversation related to autonomous driving may be performed by a conversation or facial expression determining unit.

Referring to FIG. 4, the main occupant and the non-main occupant may have a conversation related to autonomous driving. It may be determined whether a specific word is included in contents of the conversation through text mining. The main occupant and the non-main occupant may have conversations related to autonomous driving, including toll roads, underground roads, general roads, car-only roads, local roads, special roads, expressways, or downtown roads in relation to routes. The main occupant and the non-main occupant may have conversations related to autonomous driving, including halt, stop, park, out of the car, hold, or get off in relation to stopping. The main occupant and the non-main occupant may have a conversation related to autonomous driving, including a place, arrival, or a destination name in relation to the destination. Through text mining, it may be determined whether the aforementioned words are included in the contents of the conversation. However, the present disclosure is not limited thereto.

It may be determined whether the main occupant is affirmative or negative about the contents of the conversation related to autonomous driving. This determining process may be performed through a voice, conversations, or facial expressions of the main occupant. If the main occupant says, "I like it," "Yes," "Okay," etc., it may be determined that the main occupant is affirmative about the contents of the conversation related to autonomous driving. If the main occupant makes a statement, such as one of dislike, does not respond, or says NO, it may be determined that the main occupant is negative about the contents of conversation related to autonomous driving. If the main occupant smiles or nods, it may be determined that the main occupant is affirmative about the contents of conversation related to autonomous driving. If the main occupant frowns, is expressionless, or does not make face to face, it may be determined that the main occupant is negative about the contents of conversation related to autonomous driving. If the main occupant does not speak or is silent, it may be determined that the main occupant has not responded to the contents of conversation related to autonomous driving. If there is no change in facial expression because the main occupant is sleeping, etc., it may be determined that the main occupant has not responded to the contents of conversation related to autonomous driving. However, the present disclosure is not limited to such voices, conversations, or facial expressions.

If it is determined that the main occupant is affirmative about the contents of conversation related to autonomous driving, the vehicle may drive based on the contents of the conversation. Accordingly, the vehicle may change its route or stop. If it is determined that the main occupant has been negative about the contents of conversation related to autonomous driving, the vehicle may drive along the original driving route and may not drive according to the contents of conversation related to autonomous driving. When it is determined that the main occupant has not responded to the contents of conversation related to autonomous driving, the vehicle may drive along the original driving route and display the contents of conversation related to autonomous driving to the main occupant or provide an alarm.

If the non-main occupant alone has a conversation related to autonomous driving or if a positive conversation or facial expression from the main occupant is not detected, it may be determined that the main occupant has not approved the change related to autonomous driving. In this case, the non-main occupants may be informed of 'not allowed'.

Figures 5, 6:
FIG. 5 is a diagram illustrating a graphical user interface (GUI) of a non-main occupant when a main occupant does not approve an autonomous driving command of the non-main occupant according to an embodiment of the present disclosure.
FIG. 6 is a diagram illustrating a GUI of a main occupant when a non-main occupant issues an autonomous driving command according to an embodiment of the present disclosure.

FIG. 5 is a diagram illustrating a graphical user interface (GUI) of a non-main occupant when a main occupant does not approve an autonomous driving command of the non-main occupant according to an embodiment of the present disclosure.

Referring to FIG. 5, for example, a mother and a child may board an autonomous vehicle to move. The mother is a main occupant and the child is a non-main occupant. The child may have conversations related to autonomous driving, asking to stop while moving. The mother may say "NO" to that conversation or express disapproval by grimacing. The vehicle may drive on its original route without stopping. 'You cannot stop without the consent of the main occupant. Please discuss with the main occupant' may be displayed on the GUI of the non-main occupant.

FIG. 6 is a diagram illustrating a GUI of a main occupant when a non-main occupant issues an autonomous driving command according to an embodiment of the present disclosure.

Referring to FIG. 6, for example, a mother and a child may board an autonomous vehicle to move. The mother is a main occupant and the child is a non-main occupant. The child may be hungry, so the child may make conversations related to autonomous driving saying that the child wants to go to the store and get a hamburger. The non-main occupant may input an autonomous driving command to make a stop at the store. In this case, a request for adding a waypoint, a time required for adding a waypoint, a moving route when a waypoint is added, and whether or not there is a change may be displayed on the GUI of the main occupant.

Figure 7:
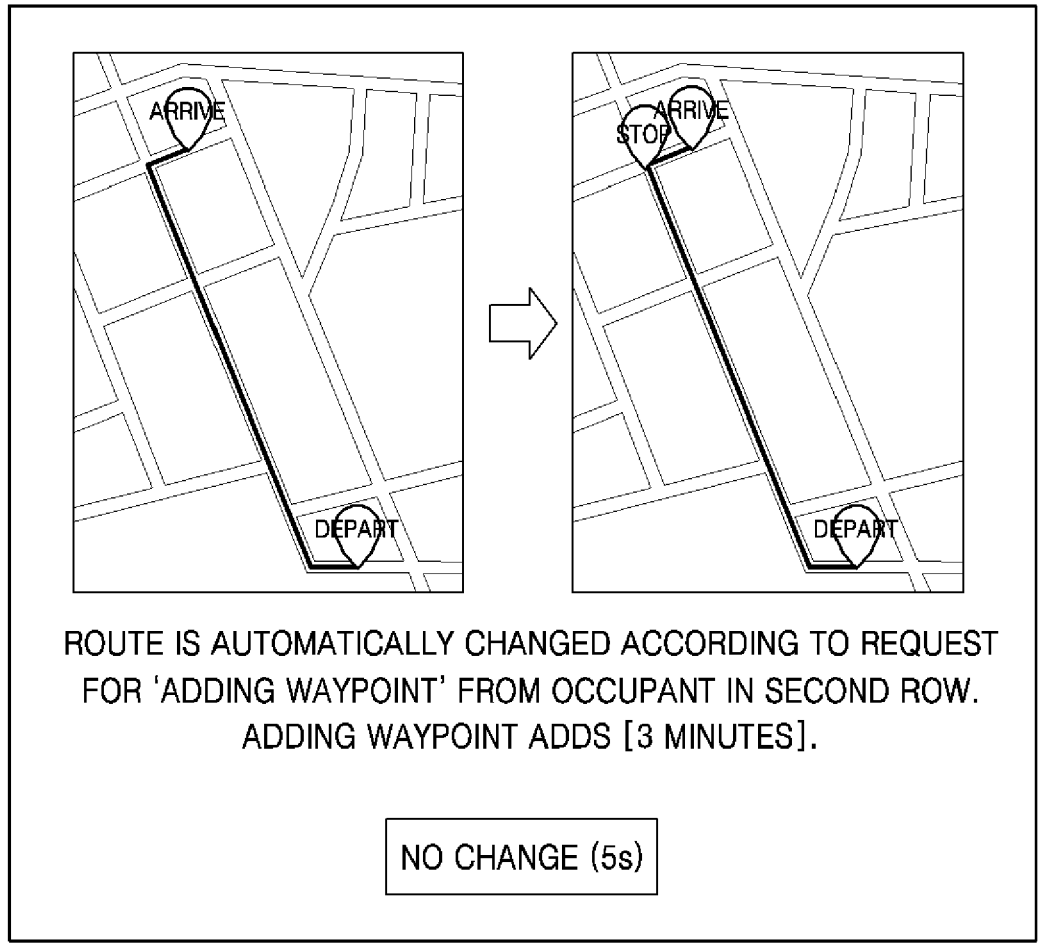
FIG. 7 is a diagram illustrating a GUI of a main occupant when a non-main occupant issues an autonomous driving command and the main occupant agrees, according to an embodiment of the present disclosure.

FIG. 7 is a diagram illustrating a GUI of a main occupant when a non-main occupant issues an autonomous driving command and the main occupant agrees, according to an embodiment of the present disclosure Referring to FIG. 7, for example, a mother and a child may board an autonomous vehicle to move. The mother is a main occupant and the child is a non-main occupant. The child may be hungry, so the child may make conversations related to autonomous driving saying that the child wants to go to the store and get a hamburger. The mother may say 'Yes' to the contents of conversation or she may express approval it by nodding her head. The vehicle may drive by adding the store as a waypoint in the original route. In this case, a request for automatically adding a waypoint, a time required for automatically adding a waypoint, a moving route when automatically adding a waypoint, and whether or not there is a change may be displayed on the GUI of the main occupant.

Figures 8, 9:
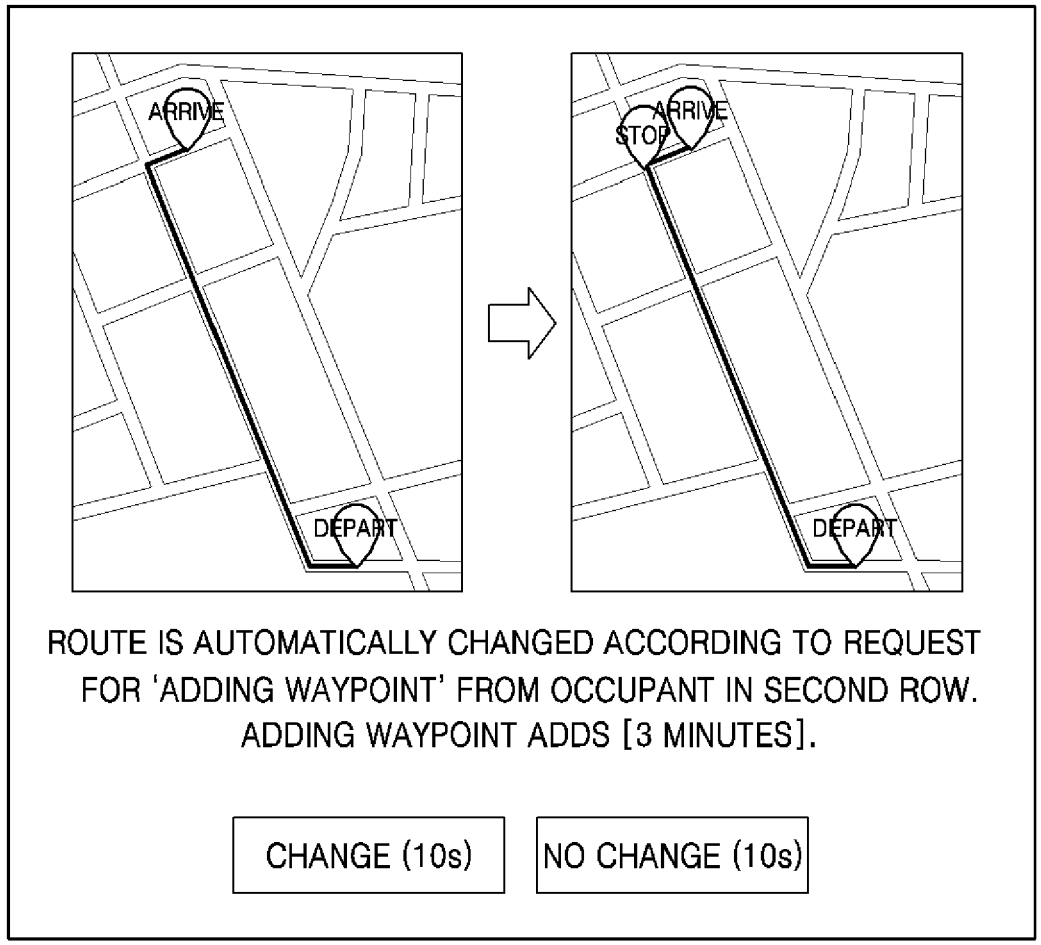
FIG. 8 is a diagram illustrating a GUI of a main occupant when a non-main occupant issues an autonomous driving command and the main occupant does not respond, according to an embodiment of the present disclosure.
FIG. 9 is a diagram illustrating a GUI of a non-main occupant when only a non-main occupant boards a vehicle and issues an autonomous driving command, according to an embodiment of the present disclosure.

FIG. 8 is a diagram illustrating a GUI of a main occupant when a non-main occupant issues an autonomous driving command and the main occupant does not respond, according to an embodiment of the present disclosure.

Referring to FIG. 8, for example, a mother and a child may board an autonomous vehicle to move. The mother is a main occupant and the child is a non-main occupant. The child may want to go to the bathroom, so the child may make conversations related to autonomous driving saying that the child wants to stop at a rest stop. The mother may be unresponsive to her child's conversations because she is sleeping. The vehicle may provide the main occupant with a request for adding a waypoint using a GUI and AUI. A request for automatically adding a waypoint, a time required for automatically adding a waypoint, a moving route when automatically adding a waypoint, and whether or not there is a change may be displayed on the GUI of the main occupant. The AUI of the main occupant may provide a voice guidance to the main occupant, saying 'the route is automatically changed because there is a request for adding a waypoint from the second row occupant.'

FIG. 9 is a diagram illustrating a GUI of a non-main occupant when only the non-main occupant boards a vehicle and issues an autonomous driving command, according to an embodiment of the present disclosure.

Referring to FIG. 9, for example, only a child may board an autonomous vehicle called by a mother to move. The child is a non-main occupant. The child may make conversations related to autonomous driving, asking to go to an amusement park. Since the mother of the child is not in the vehicle, she is unable to answer the child's request for a change of destination. In this case, a message 'Destination change cannot be made without the consent of the main occupant. Please discuss with the main occupant' may be displayed on the GUI of the non-main occupant. Whether to call the main occupant may be displayed on the GUI of the non-main occupant.

Figure 10:
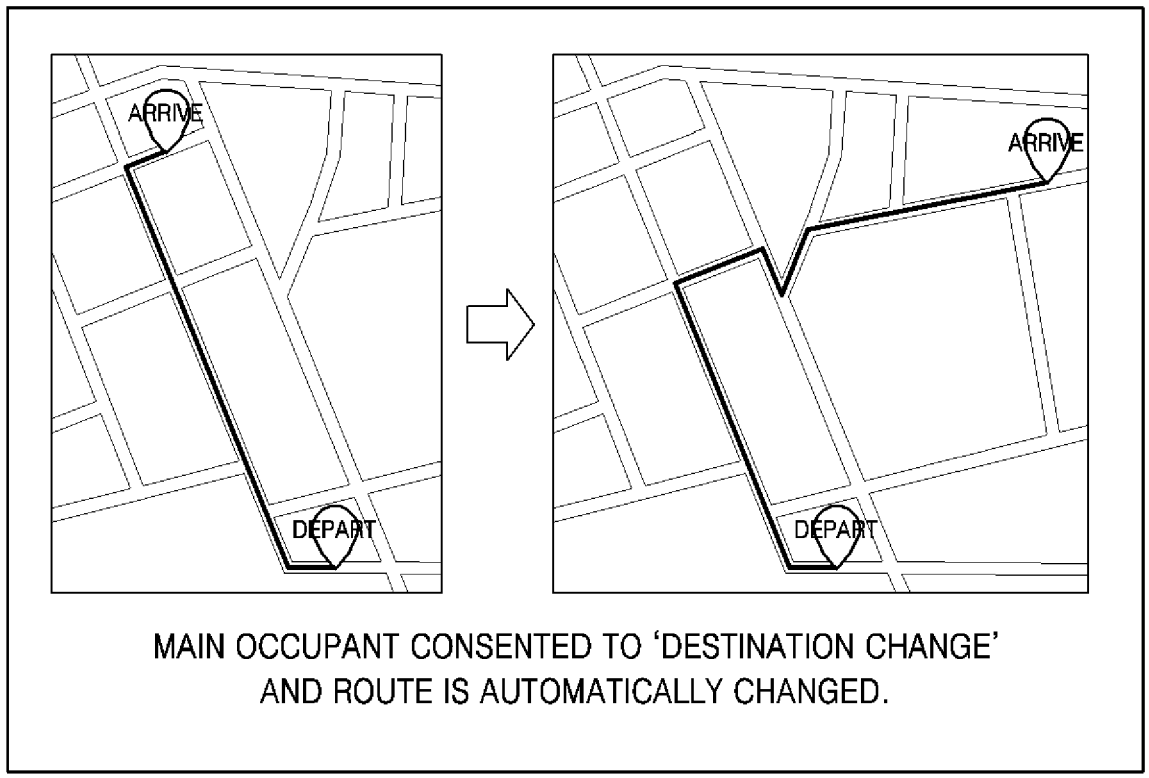
FIG. 10 is a diagram illustrating a GUI of a non-main occupant when only the non-main occupant boards a vehicle and a main occupant agrees to an autonomous driving command of the non-main occupant, according to an embodiment of the present disclosure.

FIG. 10 is a diagram illustrating a GUI of a non-main occupant when only the non-main occupant boards a vehicle and a main occupant agrees to an autonomous driving command of the non-main occupant, according to an embodiment of the present disclosure.

Referring to FIG. 10, for example, only a child may board an autonomous vehicle called by a mother to move. The child is a non-main occupant. The child may have a conversation related to autonomous driving, asking to go to his or her relative's house. Since the mother of the child is not in the vehicle, she is unable to answer the child's request for a change of destination. The vehicle may provide the child with a phone call to her mother. In a phone call with her child, the mother may agree to the child's request to go to her relative's house. In this case, an automatic change of destination, a time required for changing the destination, and a moving route when changing the destination may be displayed on the GUI of the non-main occupant.

Figure 11:
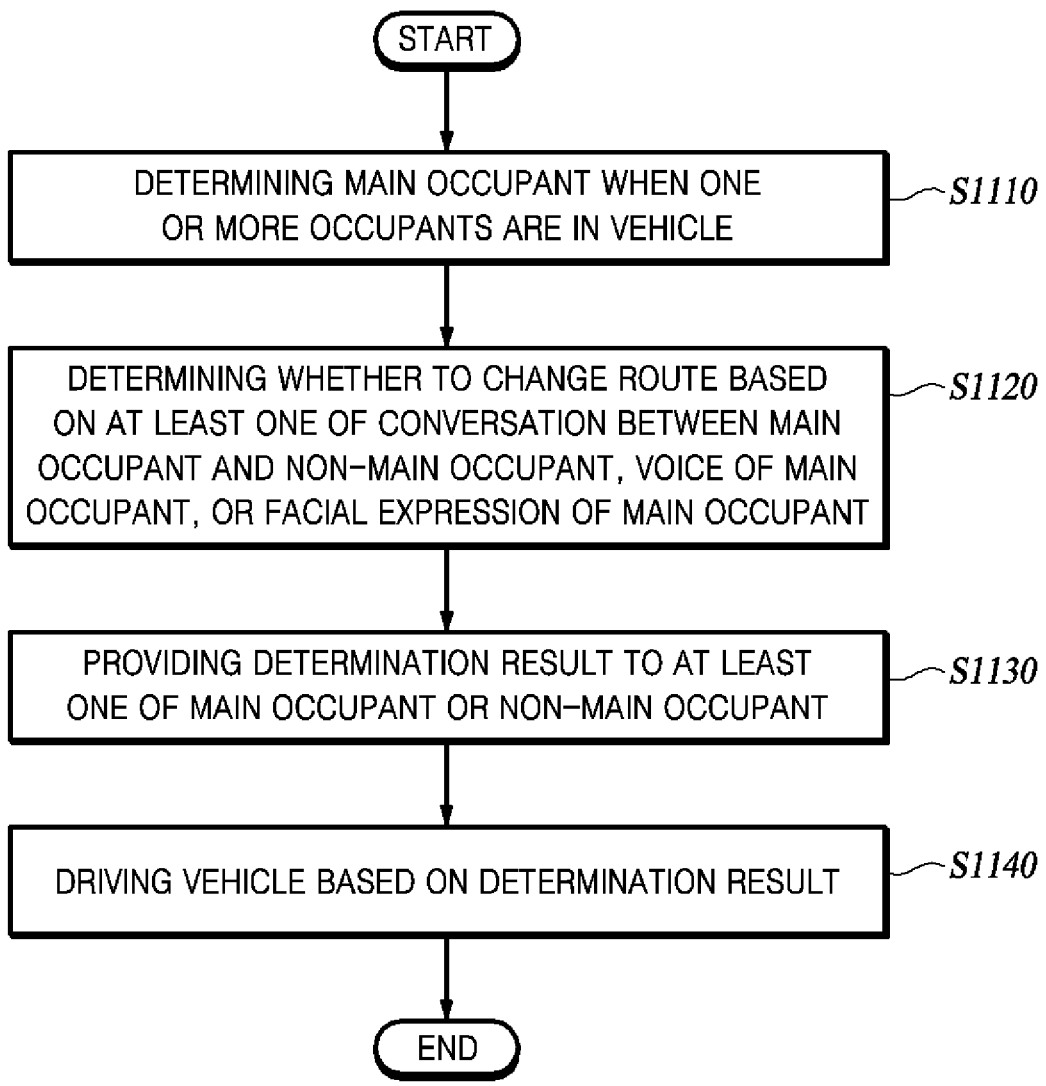
FIG. 11 is a diagram illustrating a vehicle control method according to an embodiment of the present disclosure.

FIG. 11 is a diagram illustrating a vehicle control method according to an embodiment of the present disclosure.

Referring to FIG. 11, a vehicle control apparatus may determine a main occupant when one or more occupants are in the vehicle (S1110). The determining of the main occupant may include comparing at least one of the main occupant's voice, face, fingerprint, or a location of a mobile device with pre-stored information and determining the main occupant based on a comparison result. The pre-stored information may correspond to information input by the main occupant into the mobile device, and the pre-stored information may correspond to information stored in a vehicle by linking the mobile device with the vehicle. At least one of the voice, face, fingerprint, or location of the mobile device of the main occupant may be obtained using a HMI, a camera, a microphone, and a mobile device recognizing unit mounted in the vehicle.

The vehicle control apparatus may determine whether to change a route based on at least one of a conversation between the main occupant and the non-main occupant, a voice of the main occupant, or a facial expression of the main occupant (S1120). The determining of whether to change the route may include recognizing contents related to autonomous driving in the conversation between the main occupant and the non-main occupant, determining whether the main occupant responds affirmatively or negatively based on at least one of the voice of the main occupant or the facial expression of the main occupant, and determining whether to change the route based on whether the main occupant is affirmative or negative. When only the non-main occupant boards the vehicle, the determining of whether to change the route may include connecting the non-main occupant and the main occupant via cable if the non-main occupant requests a route change and determining whether to change the route based on the contents of conversation between the non-main occupant and the main occupant via cable.

The vehicle control apparatus may provide a determination result to at least one of the main occupant or the non-main occupant (S1130). The vehicle control apparatus may drive the vehicle based on the determination result (S1140). The determination result may be displayed or announced by voice. The determination result may be displayed using a GUI or announced by voice using an AUI. The determination result may include at least one of a destination, a waypoint, a moving route, an estimated time, or whether there is a change. When only the main occupant boards the vehicle, an input for autonomous driving into the HMI in the first row of the vehicle and the HMI in the second row of the vehicle may be allowed. When the main occupant is in the first row of the vehicle and the non-main occupant is in the second row of the vehicle, an input for autonomous driving into the HMI in the first row of the vehicle may be allowed, and an input for autonomous driving into the HMI in the second row of the vehicle may not be allowed.

According to embodiments of the present disclosure, a method and apparatus for controlling a vehicle by considering not only voice or facial expressions of a main occupant but also voice or facial expressions of a non-main occupant may be provided.

Also, according to embodiments of the present disclosure, a method and apparatus for effectively managing an autonomous driving command system between a main occupant and a non-main occupant may be provided.

Further, according to embodiments of the present disclosure, a method and apparatus for effectively distinguishing between autonomous driving commands of a main occupant and a non-main occupant may be provided.

Effects obtainable by embodiments of the present disclosure are not limited to the effects mentioned above, and other effects not mentioned may be clearly understood by those skilled in the art from the description below.

Each component of the device or method according to embodiments of the present disclosure may be implemented as hardware or software, or a combination of hardware and software. In addition, the function of each component may be implemented by software, and a microprocessor may be implemented to execute a software function corresponding to each component.

Various implementations of the systems and techniques described herein may be realized by digital electronic circuitry, integrated circuits, field programmable gate arrays (FPGAs), application specific integrated circuits (ASICs), computer hardware, firmware, software, and/or combinations thereof. These various implementations may include implementation as one or more computer programs executable on a programmable system. The programmable system includes at least one programmable processor (which may be a special-purpose processor or a general-purpose processor) coupled to receive data and instructions from a storage system, at least one input device, and at least one output device and to transmit data and instructions thereto. Computer programs (also known as programs, software, software applications, or code) include instructions for a programmable processor and are stored in a "computer-readable recording medium."

The computer-readable recording medium includes all types of recording devices in which data readable by a computer system is stored. The computer-readable recording medium may be a non-volatile or non-transitory medium, such as a ROM, a CD-ROM, a magnetic tape, a floppy disk, a memory card, a hard disk, a magneto-optical disk, and a storage device and may further include a transitory medium, such as a data transmission medium. In addition, the computer-readable recording medium may be distributed in a network-connected computer system, and a computer-readable code may be stored and executed in a distributed manner.

In the flowchart/timing diagram of embodiments of the present specification, it is described that each process is sequentially executed, but this is merely an example of the technical idea of embodiments of the present disclosure. In other words, those skilled in the art to which an embodiment of the present disclosure pertains may change and execute the order described in the flowchart/timing diagram or perform one of processes in parallel to apply various modifications and variations without departing from the scope of the embodiments of the present disclosure, and therefore, the flowchart/timing diagram is not limited to a time-series sequence.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for controlling a vehicle using a vehicle control apparatus, the method comprising:
   determining whether one or more occupants are in the vehicle;
   determining whether to change a route based on a conversation between a main occupant and a non-main occupant, a voice of the main occupant, and a facial expression of the main occupant;
   providing a determination result to the main occupant or the non-main occupant, wherein the determination result is displayed or announced by voice; and
   driving the vehicle based on the determination result,
   wherein determining whether to change the route comprises:
     recognizing contents related to autonomous driving in the conversation between the main occupant and the non-main occupant based on text mining;
     determining whether the main occupant is affirmative or negative based on the voice of the main occupant and the facial expression of the main occupant; and
     determining whether to change the route based on whether the main occupant is affirmative or negative.

2. The method of claim 1, further comprising determining the main occupant by:
comparing a voice, a face, a fingerprint, or a location of a mobile device of the main occupant with pre-stored information; and
determining the main occupant based on a comparison result.

3. The method of claim 2, wherein the pre-stored information comprises information input by the main occupant into the mobile device and stored in the vehicle by interworking of the mobile device with the vehicle.

4. The method of claim 2, wherein the voice, the face, the fingerprint, or the location of the mobile device of the main occupant is obtained using a human machine interface, a camera, a microphone, or a mobile device recognizing unit mounted in the vehicle.

5. The method of claim 1, wherein the determination result is provided by displaying the determination result by a graphical user interface or by announcing the determination result via voice by an auditory user interface.

6. The method of claim 1, wherein the determination result comprises a destination, a waypoint, a moving route, an estimated time, or whether there is a change.

7. The method of claim 1, wherein determining whether to change the route, based on a situation in which only the non-main occupant is in the vehicle, comprises:
connecting the non-main occupant and the main occupant via a phone call when the non-main occupant requests a route change; and
determining whether to change the route based on contents of the conversation between the non-main occupant and the main occupant.

8. The method of claim 1, further comprising allowing, based on a situation in which only the main occupant is in the vehicle, an input for autonomous driving in a first human machine interface in a first row of the vehicle or in a second human machine interface in a second row of the vehicle.

9. The method of claim 1, further comprising, based on a situation in which the main occupant is in a first row of the vehicle and the non-main occupant is in a second row of the vehicle, allowing an input for autonomous driving in a first human machine interface in the first row of the vehicle and not allowing an input for autonomous driving in a second human machine interface in the second row of the vehicle.

10. A vehicle control apparatus comprising:
a memory; and
a processor configured to:
determine whether one or more occupants are in a vehicle;
determine whether to change a route based on a conversation between a main occupant and a non-main occupant, a voice of the main occupant, and a facial expression of the main occupant;
provide a determination result to the main occupant or the non-main occupant, wherein the determination result is displayed or announced by voice; and
drive the vehicle based on the determination result,
wherein the processor is configured to:
recognize contents related to autonomous driving in the conversation between the main occupant and the non-main occupant based on text mining;
determine whether the main occupant is affirmative or negative based on the voice of the main occupant and the facial expression of the main occupant; and
determine whether to change the route based on whether the main occupant is affirmative or negative.

11. The apparatus of claim 10, wherein the processor is configured to:
compare a voice, a face, a fingerprint, or a location of a mobile device of the main occupant with pre-stored information; and
determine the main occupant based on a comparison result.

12. The apparatus of claim 11, wherein the pre-stored information comprises information input by the main occupant into the mobile device and stored in the vehicle by interworking of the mobile device with the vehicle.

13. The apparatus of claim 11, wherein the voice, the face, the fingerprint, or the location of the mobile device of the main occupant is obtained using a human machine interface, a camera, a microphone, or a mobile device recognizing unit mounted in the vehicle.

14. The apparatus of claim 10, wherein the determination result is displayed using a graphical user interface or announced by voice using an auditory user interface.

15. The apparatus of claim 10, wherein the determination result comprises a destination, a waypoint, a moving route, an estimated time, or whether there is a change.

16. The apparatus of claim 10, wherein, based on a situation in which only the non-main occupant is in the vehicle and the non-main occupant requests a route change, the processor is configured to:
connect the non-main occupant and the main occupant via a phone call; and
determine whether to change the route based on contents of the conversation between the non-main occupant and the main occupant.

17. The apparatus of claim 10, wherein, based on a situation in which only the main occupant is in the vehicle, the processor is configured to allow an input for autonomous driving in a first human machine interface in a first row of the vehicle and a second human machine interface in a second row of the vehicle.

18. The apparatus of claim 10, wherein, based on a situation in which the main occupant is in a first row of the vehicle and the non-main occupant is in a second row of the vehicle, the processor is configured to allow an input for autonomous driving in a first human machine interface in the first row of the vehicle and to not allow an input for autonomous driving in a second human machine interface in the second row of the vehicle.

* * * * *